(12) United States Patent
Meehan (10) Patent No.: US 12,506,738 B2
(45) Date of Patent: Dec. 23, 2025

(54) PRIVACY-PRESERVING IDENTITY VERIFICATION

(71) Applicant: Fall Guy LLC, Seattle, WA (US)

(72) Inventor: Patrick Meehan, Seattle, WA (US)

(73) Assignee: Fall Guy LLC, Seattle, WA (US)

( * ) Notice: Subject to any disclaimer, the term of this patent is extended or adjusted under 35 U.S.C. 154(b) by 314 days.

(21) Appl. No.: 18/166,680

(22) Filed: Feb. 9, 2023

(65) Prior Publication Data

US 2023/0254316 A1 Aug. 10, 2023

Related U.S. Application Data

(60) Provisional application No. 63/363,096, filed on Apr. 15, 2022, provisional application No. 63/267,836, filed on Feb. 10, 2022.

(51) Int. Cl.
*H04L 9/40* (2022.01)

(52) U.S. Cl.
CPC .................................. *H04L 63/102* (2013.01)

(58) Field of Classification Search
CPC .................................................... H04L 63/102
See application file for complete search history.

(56) References Cited

U.S. PATENT DOCUMENTS

| | | | | |
|---|---|---|---|---|
| 8,694,496 B2 * | 4/2014 | Erickson | ................ | G06Q 30/02 707/732 |
| 10,757,207 B1 * | 8/2020 | Kharwandikar | ....... | G08B 21/22 |
| 10,924,571 B1 * | 2/2021 | Mutagi | ................. | H04L 67/306 |
| 11,205,428 B1 * | 12/2021 | Bao | .......................... | G06F 40/30 |
| 11,227,591 B1 * | 1/2022 | Ockene | .................... | G06F 21/32 |
| 11,411,733 B1 * | 8/2022 | Dailey | ................. | H04L 9/3226 |
| 11,908,480 B1 * | 2/2024 | Teng | ..................... | G10L 17/00 |
| 2001/0024425 A1 * | 9/2001 | Tsunoda | ................. | H04H 60/15 370/282 |
| 2007/0143860 A1 * | 6/2007 | Hardt | ................... | H04L 63/0421 726/28 |
| 2009/0138794 A1 * | 5/2009 | Becker | .................... | G06F 9/451 715/234 |
| 2015/0269628 A1 * | 9/2015 | Urtso | ................. | G06Q 30/0269 705/14.66 |
| 2016/0063270 A1 * | 3/2016 | Brock | ................. | G06F 21/6218 726/28 |
| 2016/0127341 A1 | 5/2016 | Yan | | |

(Continued)

OTHER PUBLICATIONS

ISA United States Patent and Trademark Office, International Search Report and Written Opinion Issued in Application No. PCT/US2023/062264, Jul. 11, 2023, WIPO, 13 pages.

*Primary Examiner* — Jason Chiang
(74) *Attorney, Agent, or Firm* — Alleman Hall & Tuttle LLP (57) ABSTRACT

A method for privacy-preserving identity verification includes, at a computing node, receiving, over a computer network, a unique user identifier for a user within an online community, and a community identifier for the online community. An identity profile identifier is computer-generated based at least in part on the unique user identifier, the community identifier, and a nonce identification value. A network-accessible identity profile for the user is computer-generated, the identity profile including one or more verified identity claims for the user, and the identity profile indexed by the identity profile identifier.

13 Claims, 10 Drawing Sheets

(56) References Cited

U.S. PATENT DOCUMENTS

| | | | |
|---|---|---|---|
| 2016/0164885 A1 | 6/2016 | Kirkham et al. | |
| 2017/0111175 A1 | 4/2017 | Oberhauser et al. | |
| 2017/0270285 A1 | 9/2017 | Spence | |
| 2018/0124036 A1 | 5/2018 | Holtz | |
| 2018/0232201 A1* | 8/2018 | Holtmann | G06V 40/10 |
| 2018/0232562 A1* | 8/2018 | Cambor | G06V 40/172 |
| 2018/0374097 A1* | 12/2018 | Hanna | H04L 63/123 |
| 2019/0095600 A1* | 3/2019 | Chan | G06F 21/316 |
| 2019/0334724 A1* | 10/2019 | Anton | G06F 16/9535 |
| 2019/0363885 A1* | 11/2019 | Schiavoni | G06F 21/31 |
| 2020/0092107 A1* | 3/2020 | Cole | G06F 21/6245 |
| 2020/0213311 A1* | 7/2020 | Saha | H04L 9/3268 |
| 2020/0274835 A1* | 8/2020 | McCue | H04L 51/48 |
| 2020/0322169 A1* | 10/2020 | Michaud | H04L 9/3247 |
| 2021/0036867 A1* | 2/2021 | Attard | G06Q 10/10 |
| 2021/0185035 A1* | 6/2021 | Fernandez Yu | G06F 16/2379 |
| 2021/0234847 A1* | 7/2021 | MacDonald | H04L 67/104 |
| 2021/0287321 A1* | 9/2021 | Gormley | G06Q 10/02 |
| 2022/0113102 A1* | 4/2022 | Mogaka | H04W 4/33 |
| 2022/0300962 A1* | 9/2022 | Zia | G06Q 20/38215 |
| 2023/0004438 A1* | 1/2023 | Sivaramachandran | G06F 9/5005 |
| 2024/0031450 A1* | 1/2024 | Fu | H04L 67/306 |

\* cited by examiner

PRIVACY-PRESERVING IDENTITY VERIFICATION

CROSS REFERENCE TO RELATED APPLICATIONS

This application claims priority to U.S. Provisional Patent Application Ser. No. 63/267,836, filed Feb. 10, 2022, and also claims priority to U.S. Provisional Patent Application Ser. No. 63/363,096, filed Apr. 15, 2022, the entirety of each of which is hereby incorporated herein by reference for all purposes.

BACKGROUND

When joining an online community, it is often required for a user to provide personal identity details to confirm their eligibility for membership—e.g., to confirm that the user meets a minimum age requirement. Such details are often provided by the user directly to the online community, where they are stored by the online community for future reference.

SUMMARY

A method for privacy-preserving identity verification includes, at a computing node, receiving, over a computer network, a unique user identifier for a user within an online community, and a community identifier for the online community. An identity profile identifier is computer-generated based at least in part on the unique user identifier, the community identifier, and a nonce identification value. A network-accessible identity profile for the user is computer-generated, the identity profile including one or more verified identity claims for the user, and the identity profile indexed by the identity profile identifier.

DETAILED DESCRIPTION

Joining an online community (e.g., social network, online forum, digital marketplace) often requires a user to provide various personal identity details, such as their birthdate or nationality, to the online community in order to verify their eligibility for membership. However, it can be difficult for the online community to trust that the information provided by the user is accurate and is not, for instance, falsified information provided with the intention of creating multiple different accounts. Furthermore, the user may not wish to be personally identifiable as a member of any particular community, and may be reluctant to share certain personal details with the community, such as their real name.

Accordingly, the present disclosure is directed to computerized techniques for implementing a privacy-preserving identity verification service, which enables generation of an identity profile that can be used to verify selected personal details for a user to an online community. The identity profile is indexed by a unique identity profile identifier, which is derived at least in part from a user identifier for a user within the online community (e.g., a unique username), a community identifier for the online community (e.g., a website address), and a nonce identification value (e.g., cryptographically random value generated by the verification service). The identity profile includes identity claims that have been verified by the verification service, and that a user has chosen to share with a particular online community. In this manner, members of the online community can trust that the personal details shared by the user have been verified as accurate. Furthermore, the design of the verification service is such that no particular party within the service has enough information about the user to tie them back to any particular online community, as will be described in more detail below.

The techniques described herein beneficially enable the user to limit access to their identity profile by controlling who has access to the three components of the identity profile identifier—specifically, the user identifier, community identifier, and nonce identification value. For example, the user can choose to publish the nonce identification value on their user account page within the online community. In this manner, other members of the community can combine the user's identifier, the community identifier, and the nonce identification value to recreate the identity profile identifier for the user's identity profile, allowing them to find the profile and review the user's verified identity claims. However, anyone who does not have access to all three parts of the identity profile identifier (e.g., because they are not a member of the community and are therefore unable to view the user's community account page) will not be able to associate the user with any particular identity profile maintained by the verification service.

Figure 1A:
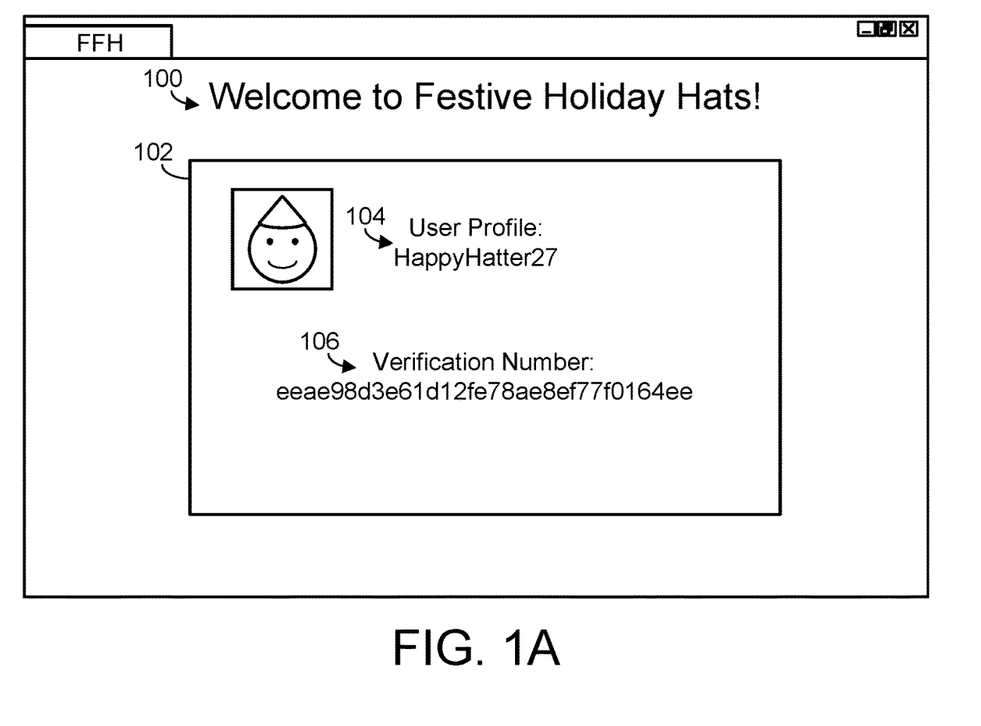
FIGS. 1A and 1B schematically illustrate the use of a privacy-preserving identity verification service to verify identity details for an online community.
Figure 1B:
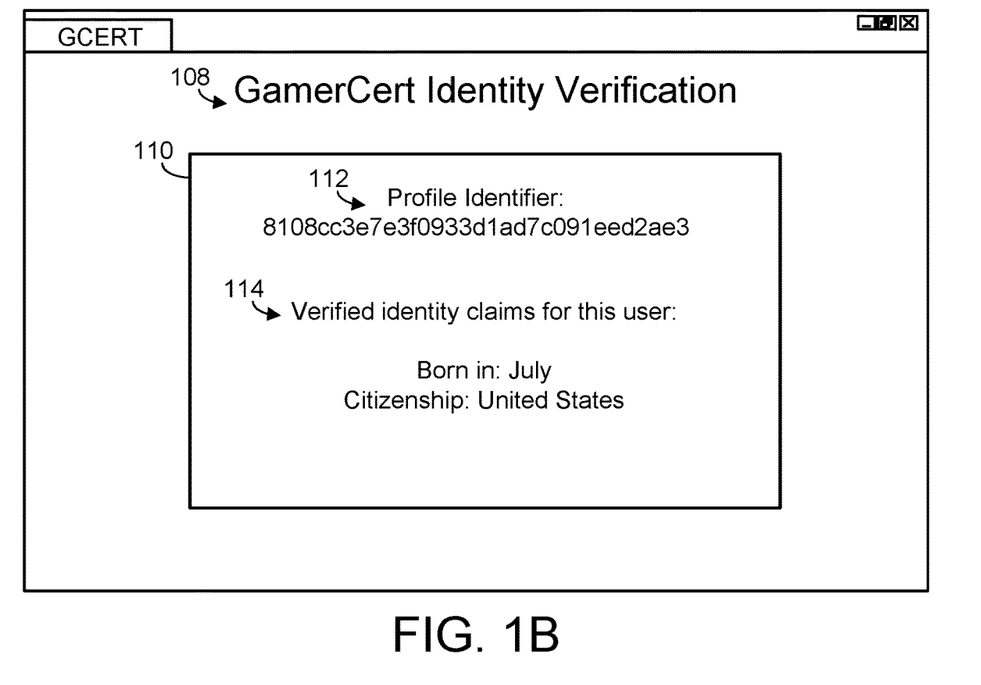

This is schematically illustrated with respect to FIGS. 1A and 1B. Specifically, FIG. 1A shows an example website corresponding to an online community 100, which in this non-limiting example is called "Festive Holiday Hats." In general, an "online community" can refer to an online forum, social network, communication/messaging platform, digital marketplace, online gaming platform, online educational service, and/or any other suitable online platform or service that enables user(s) to create accounts, e.g., for the purpose of communication and/or collaboration.

In FIG. 1A, a user (e.g., "Alice") has created a user account 102 within the online community. The user account is associated with a user identifier 104 for Alice (e.g., "HappyHatter27"), and a verification number 106. It will be understood that the user identifier takes any suitable form— e.g., any suitable combination of alphanumeric characters or symbols, which may be chosen by the user, randomly generated, and/or determined in another suitable way. Verification number 106 is an example of a nonce identification value as introduced above.

In some examples, the nonce identification value is a cryptographically random value (e.g., a cryptographic salt generated by the identity verification service) having any suitable length, although in general the nonce identification value may take any suitable form. In some examples, the nonce identification value is randomly generated by the identity verification service (e.g., generated by a computing node as will be described in more detail below). Alternatively, in some examples, the nonce identification value is provided by the user.

The nonce identification value beneficially serves two purposes. First, it prevents a user from "squatting" on a particular user identifier (e.g., community username) by ensuring that two different identity profiles will have different profile identifiers, even if the user identifiers and community identifiers used to generate the profile identifiers are the same. Secondly, the nonce identification value in some cases introduces an element of randomness sufficient to make a brute force attack against the profile identifier infeasible—e.g., even if the user identifier and community identifier are known, the attacker would still have to guess the nonce identification value.

By publishing the nonce identification value on her user account page, Alice enables other members of the community to find an identity profile created for Alice by the identity verification service, and thereby verify any identity claims that Alice is making about herself. Specifically, as described above, the identity profile is accessible via an identity profile identifier, which is derived from the user identifier (e.g., "HappyHatter27"), the online community identifier (e.g., www.festiveholidayhats.example), and a nonce identification value (e.g., verification number 106). This beneficially enables users of the online community to find Alice's identity profile without requiring any integration between the online community's website and the verification service, although the community website may opt to provide a direct link to the verification service.

In this example, the community identifier takes the form of a website address, although it will be understood that this is non-limiting. In general, the "community identifier" takes the form of any suitable sequence of characters that is used to uniquely identify an online community. For instance, in some examples, the community identifier is an informal name used by members of the community to refer to the community as a whole, rather than a website address.

FIG. 1B shows a different example website for an identity verification service 108, having the non-limiting name "GamerCert." The verification service includes an identity profile 110 created for Alice, as will be described in more detail below. The identity profile is indexed by an identity profile identifier 112, and includes a plurality of verified identity claims 114 for the user. In this non-limiting example, the verified identity claims specify that Alice was born in July and is a United States citizen. However, it will be understood that the identity profile can include any number and variety of verified identity details for a user, such as the user's name, citizenship, address, current location, financial information, health information, etc.

The approach illustrated in FIGS. 1A and 1B beneficially requires no integration between the online community website and the identity verification service. For instance, the user may post their nonce identification value on any website allowing them to add arbitrary text to a "profile" or "about me" section. In other examples, however, the online community website supports direct integration with the online verification service. For instance, the online community website may include a specific option for the user to provide their nonce identification value, which in some cases is publicly visible on the user's account page. In some examples, the online community website includes functionality for automatically deriving the user's identity profile identifier, accessing the identity verification service (e.g., via an application programming interface of the verification service), parsing any verified identity claims included in the user's identity profile, and adding such claims to the user's profile in the online community. Additionally, or alternatively, either or both of the online community and identity profile may refrain from publishing the user's identity claims themselves, but rather may include an indication that whatever information the user has provided has been verified as accurate and/or is compliant with respect to one or more criteria (e.g., user is verified as being above minimum age without listing the user's age).

Figure 2:
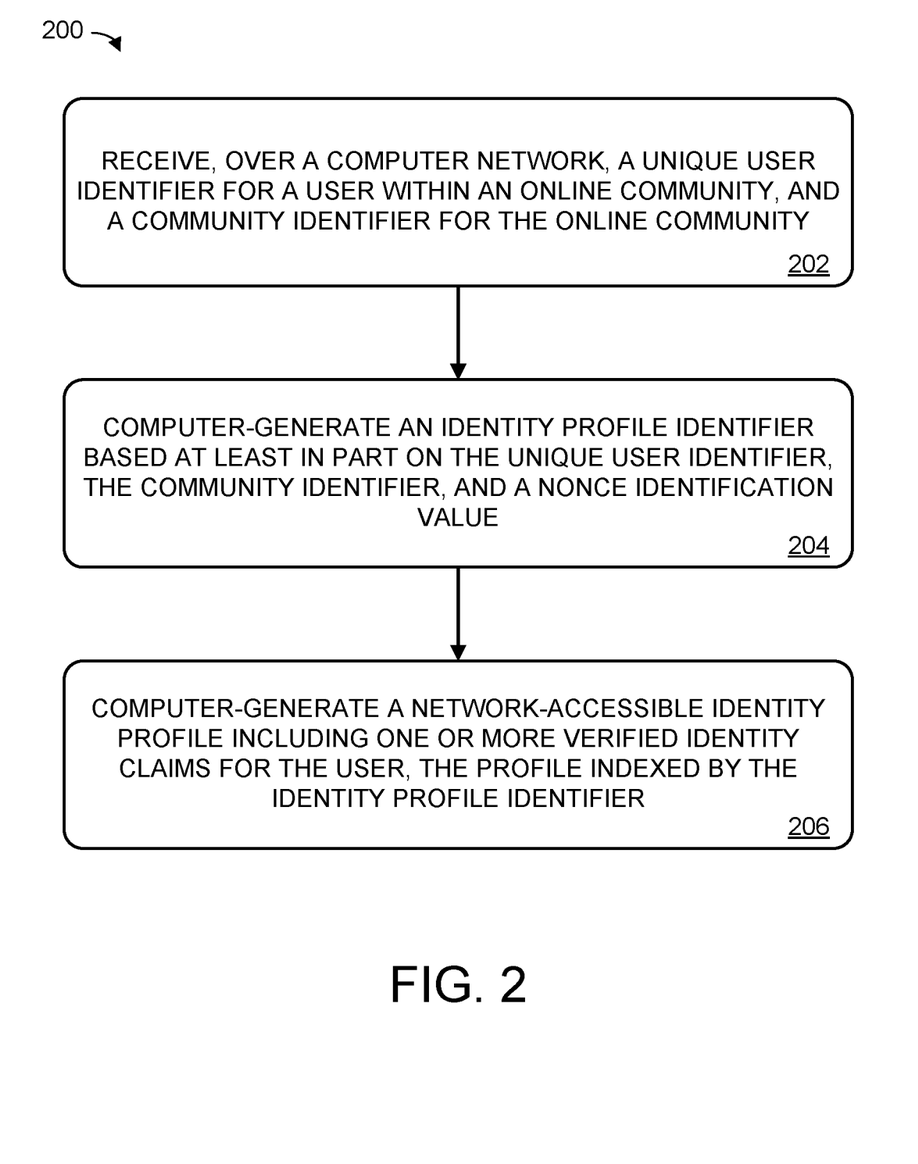
FIG. 2 illustrates an example method for privacy-preserving identity verification.

FIG. 2 illustrates an example method 200 for privacy-preserving identity verification. Method 200 may be performed by any suitable computing system of one or more computing devices. A computing device implementing steps of method 200 may have any suitable capabilities, form factor, and hardware configuration. In particular, steps of method 200 are described herein as being performed by a "computing node." In some examples, this takes the form of a discrete physical computing device, such as a server computer. In other examples, however, a "computing node" takes the form of a virtual machine or other suitable virtual instance, such that a single physical computing device can independently implement multiple different computing nodes. In some examples, method 200 is implemented by computing system 600 described below with respect to FIG. 6.

At 202, method 200 includes, at a computing node, receiving, over a computer network, a unique user identifier for a user within an online community, and a community identifier for the online community. This may be done substantially as described above with respect to FIGS. 1A and 1B—e.g., a user provides their unique user identifier (e.g., website username) and the community identifier (e.g., website address) for the online community. In some examples, these are provided by the user directly to the verification service over a computer network—e.g., by entering the user identifier and community identifier into a graphical interface provided by the verification service. This beneficially requires no integration between the verification service and the online community's website. In other examples, the user identifier and community identifier are provided in another suitable way—e.g., submitted to the verification service as a single data record by the user and/or by the online community, via an API (application programming interface) of the identity verification service.

Figure 3A:
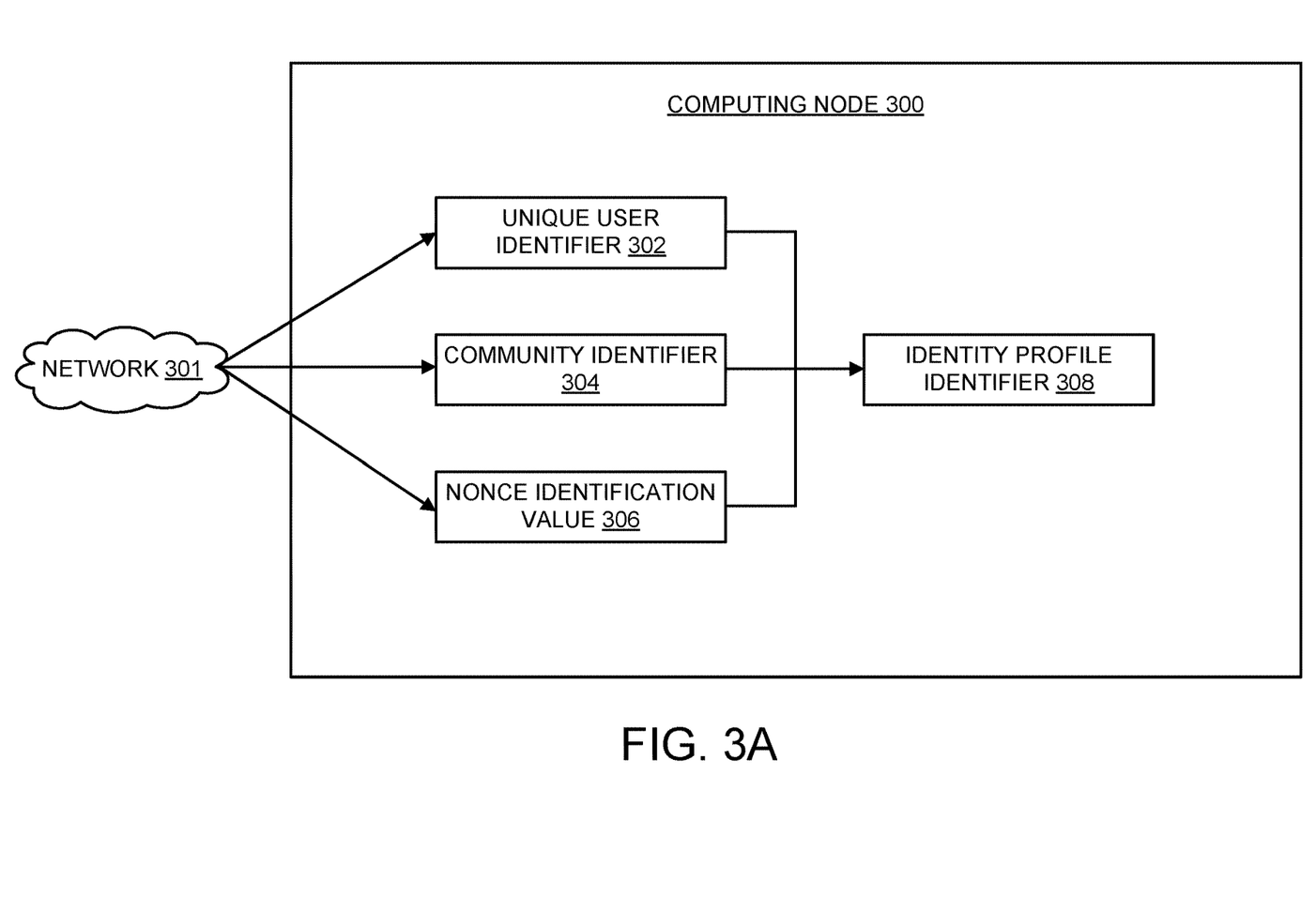
FIGS. 3A and 3B schematically illustrate a computing node maintaining an identity profile having verified identity claims for a user.

At 204, method 200 includes computer-generating an identity profile identifier based at least in part on the unique user identifier, the community identifier, and a nonce identification value. This is schematically illustrated with respect to FIG. 3A, showing an example computing node 300. As discussed above, computing node 300 takes the form of any suitable physical computing device or virtualized software instance (e.g., virtual machine). In some examples, a "computing node" as described herein is implemented as computing system 600 described below with respect to FIG. 6.

In FIG. 3A, the computing node has received a unique user identifier 302, a community identifier 304, and a nonce identification value 306. Each of these may be received from any suitable source—e.g., received over a computer network (such as the Internet) from a user computing device. In the example of FIG. 3A, the unique user identifier, community identifier, and nonce identification value are received via a computer network 301. As discussed above, in some examples, the nonce identification value is generated by the computing node (e.g., a randomly generated cryptographic string). In other examples, the nonce identification value is specified and provided by the user.

Based on the unique user identifier, the community identifier, and the nonce identification value, the computing node generates an identity profile identifier 308, which will be used to index an identity profile provisioned for the user. The identity profile identifier is generated in any suitable way, provided that it is consistently replicable (e.g., to enable users of an online community to consistently recreate the identity profile identifier based on its three substituent components). As one example, the identity profile identifier is generated by concatenating and hashing the unique user identifier, the community identifier, and the nonce identification value via a suitable hashing algorithm (e.g., MD5 hashing). The identity profile identifier 308 may be saved in any suitable format compatible with its generation approach, e.g., an integer data structure.

In some cases, after generating the identity profile identifier, the identity verification service deletes the unique user identifier, the community identifier, and the nonce identification value, while storing the identity profile identifier. This enables unique profile identifiers to be generated based on the user identifier and community identifier, while making it infeasible to recreate the user identifier or community identifier from the profile identifier.

After generating the identity profile identifier, the computing node in some cases checks for collisions against identifiers used for other identity profiles. In the unlikely event that a collision is detected, a different profile identifier can be generated based on a new nonce identification value.

Figure 3B:
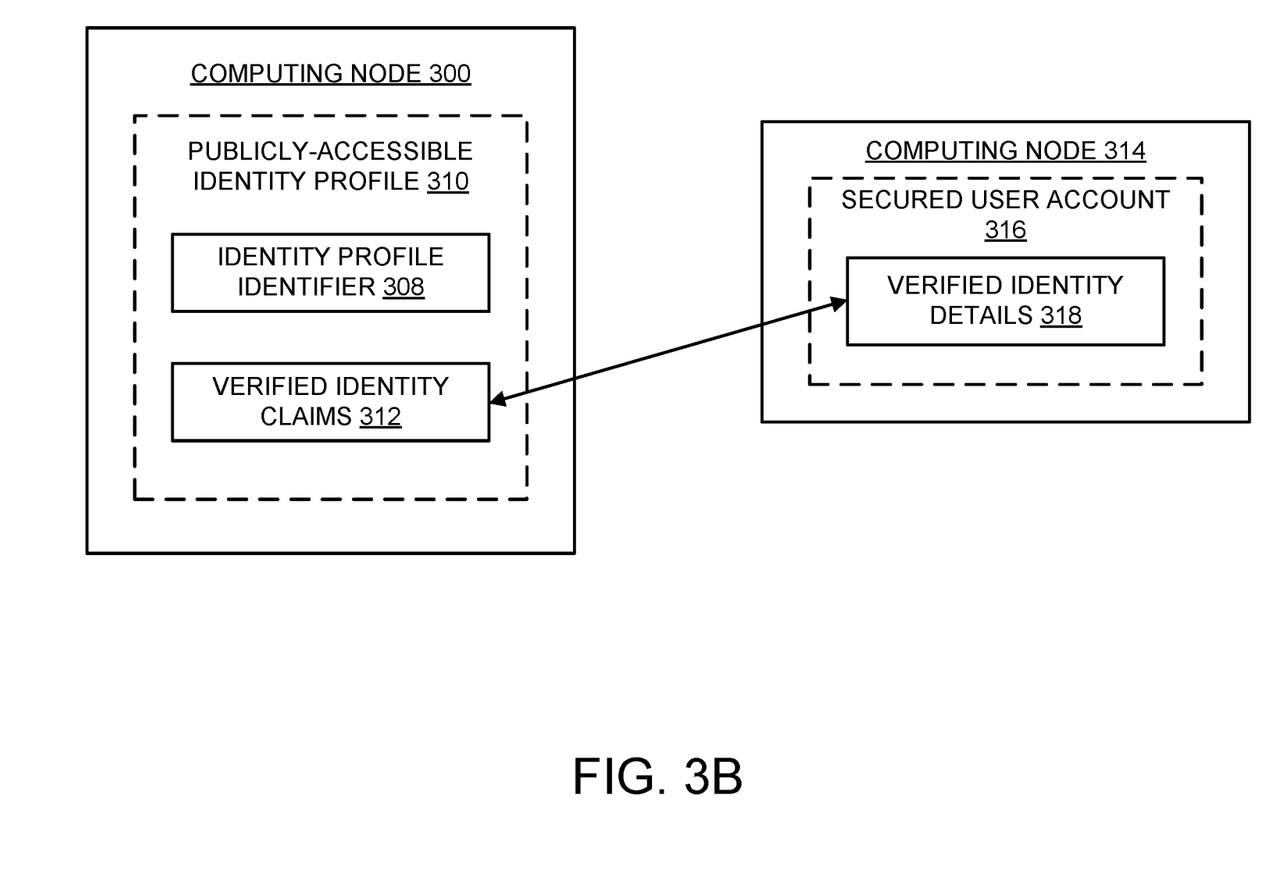

Returning briefly to FIG. 2, at 206, method 200 includes computer-generating a network-accessible identity profile for the user, the identity profile including one or more verified identity claims for the user, and the identity profile indexed by the identity profile identifier. This is schematically illustrated with respect to FIG. 3B, again showing computing node 300. In this example, the computing node has generated an identity profile 310 for the user, which is indexed by the identity profile identifier 308 generated as described above. The identity profile additionally includes a plurality of verified identity claims 312 for the user.

In some examples, prior to inclusion in the identity profile, the verified identity claims are verified against a plurality of verified identity details stored in a secured user account for the user, where the secured user account is maintained by a second computing node. This is also schematically illustrated with respect to FIG. 3B, in which a second computing node 314 maintains a secured user account 316, which in turn includes a number of verified identity details 318 for the user. Separating information between different computing nodes in this manner can beneficially serve to preserve user privacy—e.g., no single computing node has enough information to associate a specific user identity with the online communities that they have joined. More specific details regarding how the identity profile is generated, as well as how the user's identity claims are verified, will be described below with respect to FIGS. 4 and 5A-5E.

Figure 4:
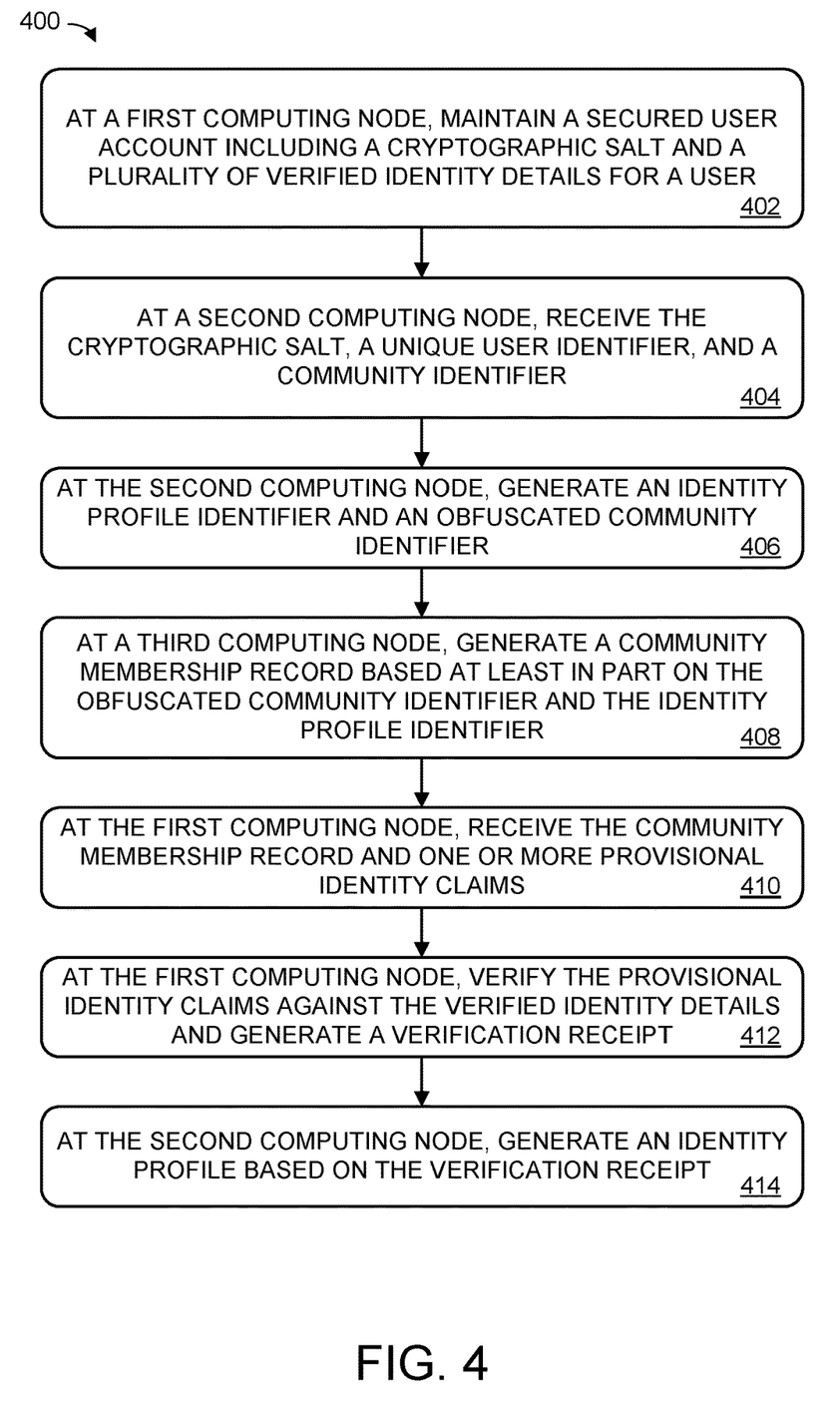
FIG. 4 illustrates an example method for privacy-preserving identity verification.

Specifically, FIG. 4 illustrates another example method 400 for privacy-preserving identity verification. As with method 200, method 400 may be performed by any suitable computing system of one or more computing devices. Any computing device implementing steps of method 400 may have any suitable capabilities, form factor, and hardware configuration. In some examples, method 400 is implemented by computing system 600 described below with respect to FIG. 6.

In particular, steps of method 400 are described as being distributed between three different computing nodes controlled by three different parties. It will be understood that this is non-limiting, and that in other examples, the steps described herein are performed by another suitable number of computing nodes. In general, distributing steps of method 400 between different computing nodes controlled by different parties as described herein beneficially prevents any single party within the identity verification service from having enough unencrypted information to associate the true identity of a user (e.g., Alice), with a specific online community (e.g., Festive Holiday Hats).

As discussed above, in some examples, the first computing node, the second computing node, and the third computing node are separate server computing devices. In other examples, however, any or all of the computing nodes are implemented as virtual machines.

Furthermore, it will be understood that the various records, identifiers, receipts, and other types of data described herein may be combined or packaged in any suitable way. With particular respect to FIGS. 5A-5E, the various types of data transmitted to and/or between the various computing nodes may be divided into any suitable number of different data packets, frames, and/or discrete data structures. For instance, in any case where a computing node is described as receiving or providing multiple different types of data, such data may be combined into a single data structure, and/or split into two or more different data structures. In general, each of the identifiers and/or other computer data/information described herein may be represented and/or saved using any suitable data structure(s).

At 402, method 400 includes, at a first computing node, maintaining a secured user account including a cryptographic salt and a plurality of verified identity details for a user. As used herein, a "secured" user account is distinct from an identity profile as discussed above, in that an identity profile is created for a specific online community and is intended to be accessible to members of that community—e.g., to verify the identity claims that the user has chosen to share. Furthermore, a user may in some examples create a number of different identity profiles corresponding to different online communities. By contrast, in some examples, the user is restricted from creating more than one secured user account with the identity verification service, and the secured user account is typically not intended for sharing with others.

Figure 5A:
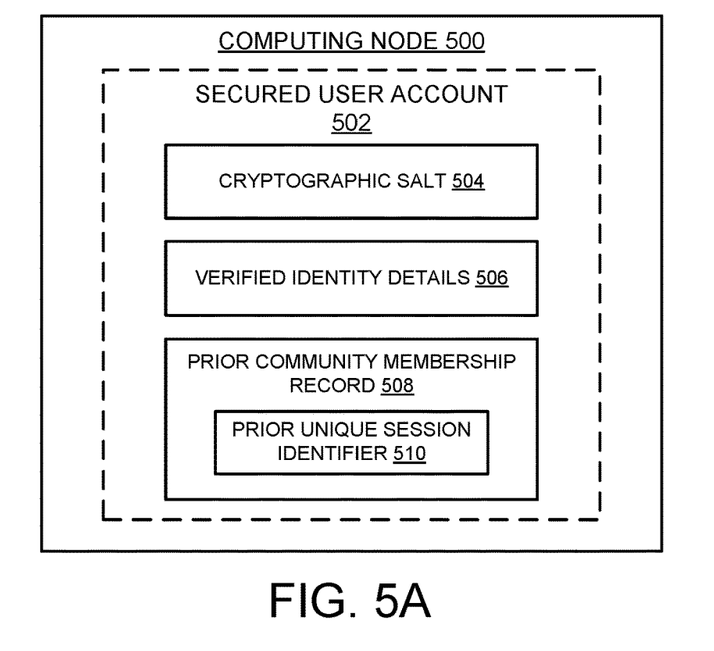
FIGS. 5A-5E schematically illustrate operation of three different computing nodes to generate an identity having verified identity claims for a user.

FIG. 5A schematically shows an example computing node 500. Computing node 500 is sometimes referred to herein as a "first computing node." As shown, computing node 500 includes a cryptographic salt 504 generated for the user. In some examples, the cryptographic salt is a random string generated by the first computing node. The cryptographic salt serves as an indication to other computing nodes described herein that a particular user has a unique user account maintained by the first computing node. For example, in some cases, the cryptographic salt is signed by the first computing node, and the signature is verified when the cryptographic salt is presented to other computing nodes. In some examples, the cryptographic salt is encrypted using a public encryption key associated with the user—e.g., the public key is one half of a key pair generated by the user on their client device using a password and a slow hashing function.

In FIG. 5A, the secured user account additionally includes a plurality of verified identity details 506. These can include any details used by the verification service to verify the user's identity—e.g., the user's name, birthdate, government identification number—and/or any personal details that the user intends to share with an online community as described above (e.g., the user's age or nationality). It will be understood that the specific identity details included in the secured user account will vary depending on the implementation.

Furthermore, such identity details are verified by the identity verification service in any suitable way. In some examples, the plurality of identity details for the user are verified during a live review session via a Know Your Customer (KYC) service. In some examples, this may involve manual review by one or more human reviewers at the identity verification service and/or KYC service to verify that the user's submitted identity details are accurate (e.g., by reviewing government-issued documentation provided by the user). Furthermore, in some cases, this includes verifying during the live review session that the computing node is not maintaining a preexisting secured user account for the user—e.g., confirming that the user is not attempting to create multiple user accounts with the identity verification service.

In some cases, any identity details verified by the first computing node are signed by the first computing node using a unique cryptographic signature, which can be used downstream by the first computing node and/or other computing nodes in the system to confirm that the identity details have been verified as accurate. Furthermore, in some cases, the verified identity details are encrypted by the first computing node, and only stored in an encrypted form—e.g., unencrypted versions of the identity details are deleted and not stored. This beneficially ensures that no personally identifying information for the user is stored by the first computing node over time. In some examples, the user saves the signed and/or encrypted identity details on their client device. As will be described in more detail, when adding verified identity claims to an identity profile, the identity verification service may first confirm that any provisional identity claims submitted by the user were signed by the first computing node, thereby verifying that the provisional identity claims are accurate.

In FIG. 5A, the secured user account additionally includes a prior community membership record 508 for the user, which includes a prior unique session identifier 510. As will be described in more detail below, these can be used to prevent scenarios where a malicious user attempts to exploit the separation between the different computing nodes to make unauthorized changes to the record of communities that they maintain identity profiles for, and/or create multiple identity profiles for the same online community.

Figure 5B:
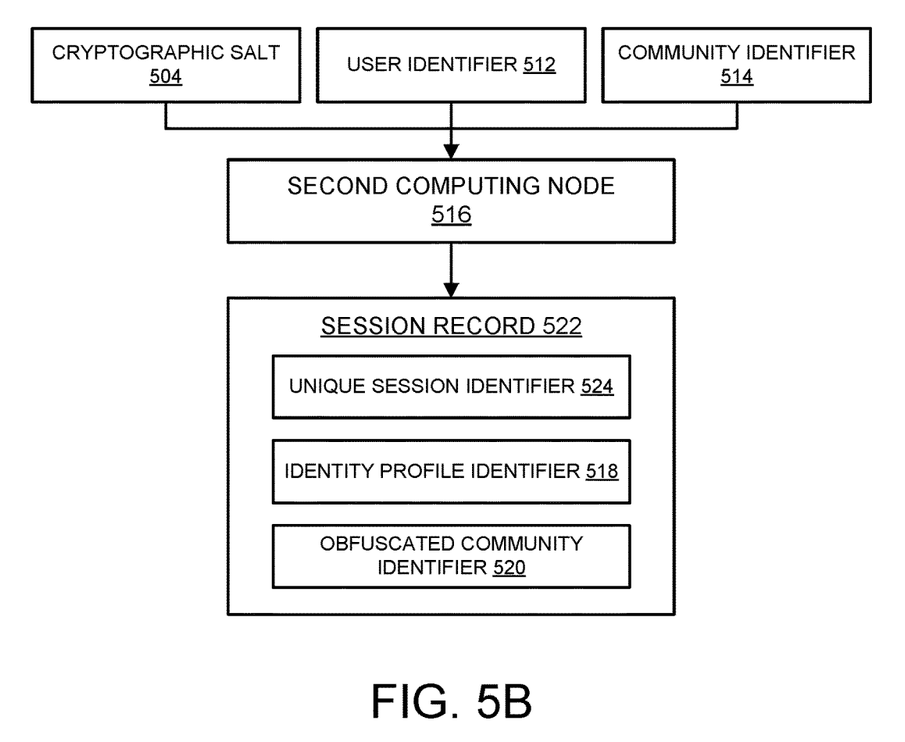

Returning briefly to FIG. 4, at 404, method 400 includes, at a second computing node, receiving the cryptographic salt, a unique user identifier for the user within an online community, and a community identifier for the online community. This is schematically illustrated with respect to FIG. 5B, showing cryptographic salt 504, a user identifier 512, and a community identifier 514 being received by a second computing node 516. The second computing node is independent from the first computing node, and therefore unable to associate the information it receives with a specific user identity—e.g., the second computing node cannot associate the user identifier or community identifier with the verified identity details stored in the user's secured account on the first computing node. However, as discussed above, the cryptographic salt is in some cases signed by the first computing node. Thus, the second computing node can confirm the authenticity of the cryptographic salt, and its origination from the first computing node, by verifying the signature.

In some examples, as discussed above, the information received at the second computing node is anonymously transmitted by the user (e.g., via their personal computing device), and is not transmitted by the online community and/or the first computing node. In such cases, the user may first decrypt their cryptographic salt prior to transmitting it to the second computing node—e.g., in cases where the cryptographic salt is encrypted via the user's public key as described above.

Returning briefly to FIG. 4, at 406, method 400 includes, at the second computing node, generating an identity profile identifier and an obfuscated community identifier. This is schematically illustrated with respect to FIG. 5B, in which the second computing node generates an identity profile identifier 518 and an obfuscated community identifier 520. In some examples, the identity profile identifier is generated based at least in part on the unique user identifier, the community identifier, and a nonce identification value as described above with respect to FIGS. 3A and 3B. Furthermore, in some examples, the obfuscated community identifier is generated based at least in part on the community identifier and the cryptographic salt—e.g., by hashing the cryptographic salt with the community identifier. Notably, because the cryptographic salt is unique to the user and does not change, the same community identifier will always result in the same obfuscated community identifier being generated, while preventing the original community identifier from being recreated by any party that only knows the obfuscated community identifier.

In some examples, the second computing node signs either or both of the identity profile identifier and the obfuscated community identifier. In this manner, other computing nodes of the identity verification service can verify the second computing node's signature, and thereby verify that the identity profile identifier and/or obfuscated community identifier are genuine and originate from the second computing node. Furthermore, in some examples, the second computing node generates a symmetric encryption key, which is used to encrypt the identity profile identifier as an encrypted identity profile identifier. In some examples, after being used to encrypt the identity profile identifier, the symmetric encryption key is itself encrypted using the user's public encryption key and provided to the user.

In some examples, the second computing node generates the identity profile identifier and the obfuscated community identifier as part of a session record having a unique session identifier. This is schematically illustrated in FIG. 5B, in which the identity profile identifier 518 and obfuscated community identifier 520 are included in a session record 522, which includes a unique session identifier 524. As will be described in more detail below, this can be used to mitigate the risk that a malicious user attempts to create multiple identity profiles for the same online community. For instance, the first computing node may store records of previous sessions for the user, and only produce a verification receipt useable to create or update an identity profile after verifying that a user-submitted community membership record references a most-recent prior session identifier.

Returning briefly to FIG. 4, at 408, method 400 includes, at a third computing node, generating a community membership record based at least in part on the obfuscated community identifier and the identity profile identifier. This is schematically illustrated with respect to FIG. 5C, in which a third computing node 526 receives the identity profile identifier 518 and obfuscated community identifier 520, and generates a community membership record 528. The community membership record includes the identity profile identifier 518 and the obfuscated community identifier 520. In general, the community membership record generated by the third computing node serves as a non-identifying list of the online communities for which the user has created identity profiles. Use of obfuscated community identifiers ensures that neither the third computing node, nor any other parties that receive the community membership record, are able to derive the actual community identifiers for the communities that the user has joined.

As discussed above, in some examples, the identity profile identifier and obfuscated community identifier are transmitted to the third computing node by a user computing device—e.g., rather than transmitted directly by the second computing node—which can serve to preserve user anonymity. In other examples, however, the identity profile identifier and obfuscated community identifier are transmitted to the third computing node in another suitable way—e.g., directly by the second computing node.

In some examples, the identity profile identifier is received by the third computing node as an encrypted identity profile identifier—e.g., after encryption by the second computing node using a symmetric encryption key. Thus, in some examples, the community membership record is generated based on the encrypted identity profile identifier.

Figure 5C:
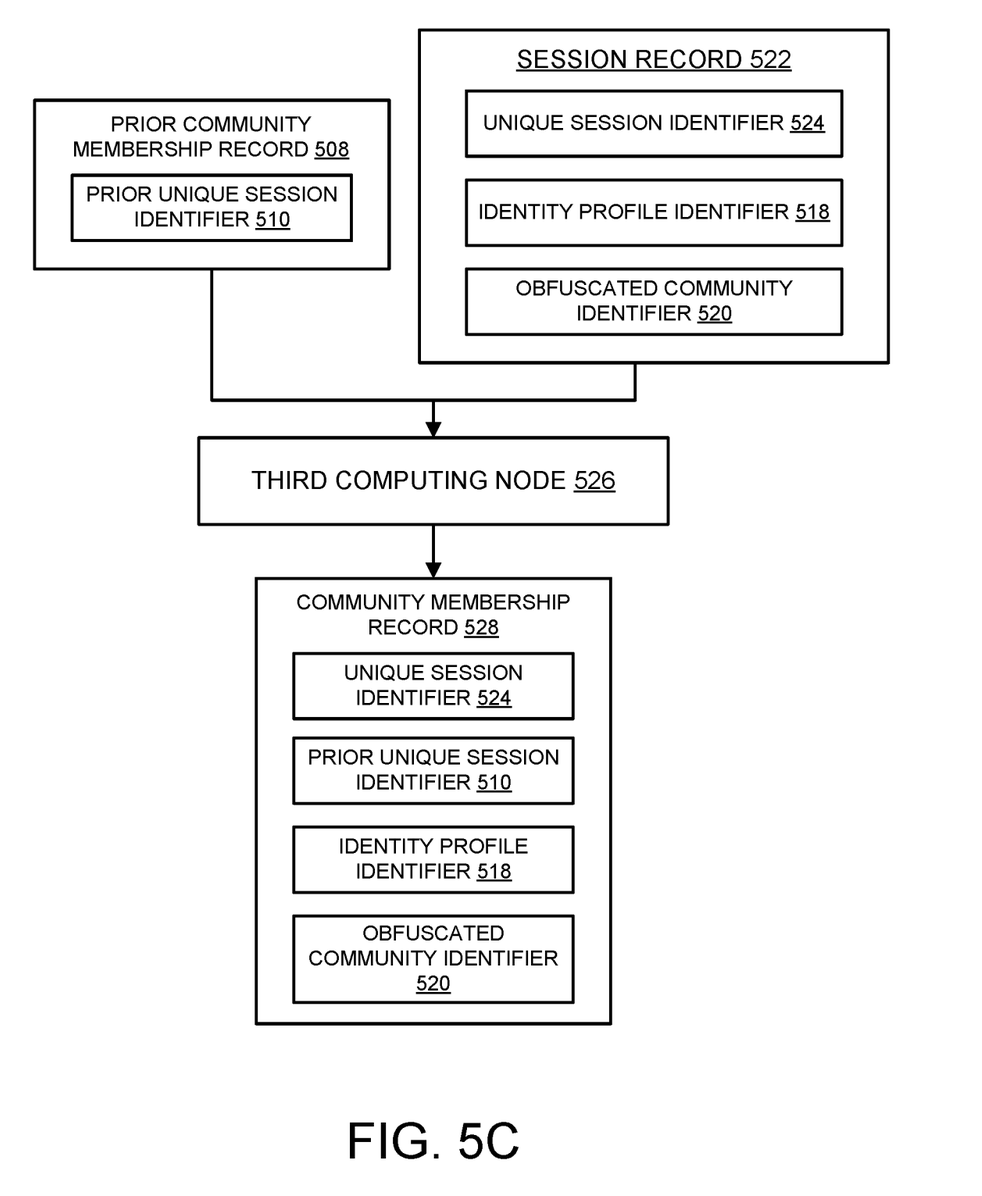

Furthermore, in some examples, the third computing node receives the identity profile identifier and obfuscated community identifier as part of a session record—e.g., session record 522 as is shown in FIG. 5C. In such cases, the community membership record includes the unique session identifier—e.g., unique session identifier 524 as shown in FIG. 5C.

In some cases, the user has not previously held any identity profiles with the identity verification service. Thus, the community membership record created by the third computing node is the first community membership record created for the user. In other examples, however, the user already has an identity profile with the identity verification service, either for the same online community corresponding to the obfuscated community identifier, or a different online community altogether. In such cases, the third computing node also receives a prior community membership record 508 associated with a prior unique session identifier 510. The prior community membership record is received from the first computing device, which previously received and stored the prior community membership record as is shown in FIG. 5A—e.g., the first computing node receives the prior community membership record during earlier provisioning of an identity profile corresponding to a different online community. Thus, when attempting to update their existing identity profile for a particular online community, or create a new identity profile for a new online community, the user may retrieve their prior community membership record from the first computing node, and submit the prior community membership record to the third computing node. For clarity, the community membership record 528 will be referred to as a "current" community membership record, and in this example, includes "current" unique session identifier 524.

When a prior community membership record is submitted to the third computing node, the third computing node adds a prior unique session identifier associated with the prior community membership record to the current community membership record being generated. For instance, in FIG. 5C, the current community membership record includes prior unique session identifier 510, in addition to current unique session identifier 524. The third computing node additionally extracts any previous obfuscated community identifiers included in the prior community membership record, and adds them to the current community membership record.

After generating the community membership record, the third computing node in some examples signs and/or encrypts the community membership record, prior to returning the community membership record to the user. This can help to mitigate the risk that a malicious user tampers with the community membership record to create falsified data.

Returning briefly to FIG. 4, at 410, method 400 includes, at the first computing node, receiving the community membership record and one or more provisional identity claims submitted by the user. At 412, method 400 includes, at the first computing node, verifying the one or more provisional identity claims against the plurality of verified identity details as one or more verified identity claims. The first computing node then generates a verification receipt corresponding to the one or more verified identity claims.

Figure 5D:
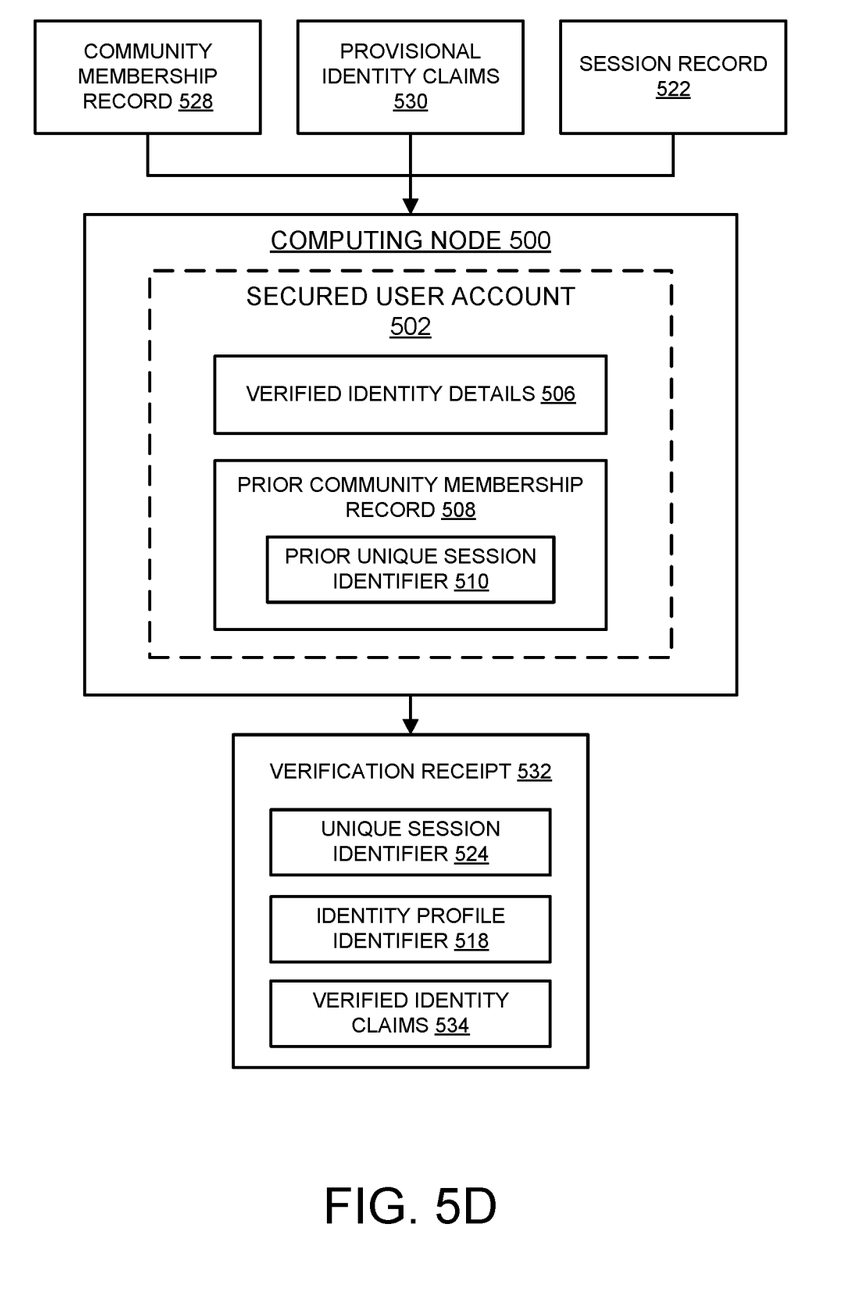
Figure 5E:
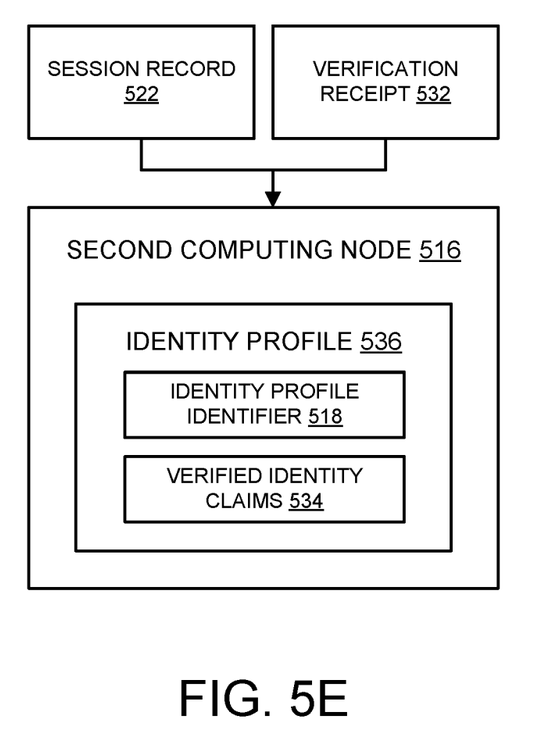

This is schematically illustrated with respect to FIG. 5D, in which first computing node 500 receives the community membership record 528 and a set of provisional identity claims 530. In the example of FIG. 5D, the first computing node additionally receives the session record 522. The provisional identity claims are verified against the set of verified identity details 506 maintained in the secured user account 502.

In some examples, the provisional identity claims are a subset of the verified identity details, and were stored by the user when the identity details were previously verified by the first computing node. As such, verifying the provisional identity claims may include confirming that the provisional identity claims are signed with a cryptographic signature of the first computing node, thereby confirming that the provisional identity claims were previously verified by the first computing node. In some examples, the provisional identity claims additionally include an embedded user account identifier, which is verified by the first computing node. The user may beneficially choose to include any selected subset of the verified identity details in the identity profile generated for a particular online community. In some examples, the user computing device and/or the first computing node may convert the provisional identity claims to use a different format—e.g., when the verification service and/or an online community use a particular format that differs from the format of the provisional identity claims.

In some examples, prior to generating the verification receipt, the first computing node confirms that the prior unique session identifier included in the prior community membership record stored by the first computing node matches the prior session identifier included in the current community membership record. For example, in FIG. 5D, the first computing node receives community membership record 528, which includes the prior unique session identifier 510 submitted to the third computing node as is shown in FIG. 5C. First computing node 500 additionally stores prior community membership record 508, also including prior unique session identifier 510. By confirming that prior unique session identifier stored by the first computing node matches the prior unique session identifier received as part of the current community membership record, the first computing node confirms that the user submitted the most-recent version of their prior community membership record to the third computing node. This can beneficially mitigate the risk that a malicious user attempts to create a falsified community membership record, or create multiple identity profiles for the same online community.

Upon receiving the current community membership record and verifying the user's provisional identity claims, the first computing node generates a verification receipt 532. This is useable by the second computing node to generate an identity profile that includes the verified identity claims. In the example of FIG. 5D, the verification receipt includes the identity profile identifier 518, the verified identity claims 534, and the current unique session identifier 524. Furthermore, in some examples, the first computing node stores the current community membership record, which will be provided as a prior community membership record the next time that the user attempts to create a new identity profile, or update an existing identity profile. In some examples, the first computing node stores the current community record provisionally, until receiving a confirmation that the verification receipt was indeed used to create or update an identity profile.

Returning briefly to FIG. 4, at 414, method 400 includes, at the second computing node, generating an identity profile based at least in part on the verification receipt. As described above, the identity profile includes the one or more verified identity claims, and is indexed by the identity profile identifier. This is schematically illustrated with respect to FIG. 5E, in which second computing node 516 receives verification receipt 532, previously generated by first computing node 500. Based at least in part on the verification receipt, the second computing node provisions an identity profile 516 for the user, the identity profile including the identity profile identifier 518 and the verified identity claims 534. In some cases, this includes updating an earlier version of the identity profile previously generated for an online community, and then deleting the previous version.

In some examples, upon successfully provisioning the identity profile, the second computing node then generates and cryptographically signs a confirmation receipt, which is provided to the user. By presenting the confirmation receipt to the first computing node, the user confirms that the current community membership record previously presented to the first computing node resulted in an identity profile being created or updated at the second computing node. As such, in some examples, the first computing node overwrites the provisional status of the current community membership record, and stores it as the most-recent prior community membership record, to be provided to the third computing node whenever the user next attempts to create or update an identity profile. In the event that the identity profile creation process is interrupted, the second computing node in some cases generates an interruption receipt for providing to the first computing node. Upon receiving the interruption receipt, the first computing node deletes the provisionally-stored community membership record, allowing the user to restart the identity profile provisioning process from the beginning.

As described above, the first computing node stores a cryptographic salt for the user, which is provided to the second computing node along with the user identifier and community identifier each time the user provisions an identity profile. In some examples, to increase privacy protection, the cryptographic salt can be masked using a blinding factor applied with an associative composition function (e.g., XOR). This can beneficially mitigate the risk that a malicious actor that gains access to the second computing node is able to track use of the same cryptographic salt over time, and thereby associate the same salt with multiple different community identifiers.

Specifically, in some examples, the user makes use of a trusted obfuscation service (OBFS) in obfuscating the cryptographic salt prior to transmission to the second computing node. In one example workflow, the user presents the salt to OBFS, which verifies a cryptographic signature of the first computing node. The OBFS generates a blind, which in some examples is a cryptographically random string having the same length as the cryptographic salt. The OBFS composes the salt and the blind as COMP (salt, blind) and signs the result, also signing the blind independently, and returns the signed components to the user.

The user next sends the community identifier and COMP (salt, blind) to the second computing node, which verifies OBFS's signature on COMP (salt, blind). The second computing node then produces COMP (community identifier, COMP (salt, blind)) and hashes the result. This hashed value is included in the session record generated for provisioning a new identity profile, which is provided to the third computing node as described above. The user additionally provides the blind to the third computing node, along with COMP (community identifier, salt), which the user produces on their client device. The third computing node verifies OBFS's signature on the blind, and verifies the second computing node's signature on the session record, and then produces a value COMP (COMP (community identifier, salt), blind), and verifies the result (or its hash) against the value found in the session record. The third computing node additionally hashes COMP (community identifier, salt), and uses the result as a key in the community membership record to store or update the identity profile identifier.

The above process beneficially enables the user to prove to the third computing node that they generated COMP (community, salt) without revealing the salt itself. Without knowing the salt, there is no way for the second or third computing nodes to derive information from the community identifier that could uniquely identify the user. Furthermore, OBFS is not provided with the community identifier, and therefore cannot link the user to any specific online community.

Any or all of the herein-described methods and processes may be implemented as an executable application, a network-accessible service, an application-programming interface (API), a library, and/or any other suitable computer resources or combinations of computer resources.

Figure 6:
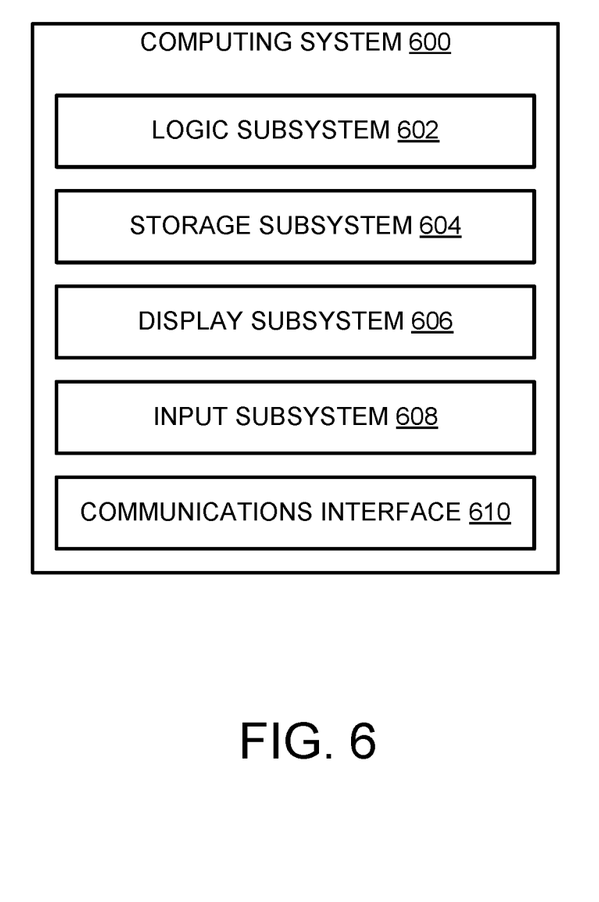
FIG. 6 schematically shows an example computing system.

FIG. 6 schematically shows a simplified representation of a computing system 600 configured to perform any or all of the techniques described herein. Computing system 600 may take the form of one or more personal computers, network-accessible server computers, mobile computing devices, mobile communication devices (e.g., smart phone), and/or other computing devices.

Computing system 600 includes a logic subsystem 602 and a storage subsystem 604. Computing system 600 may optionally include a display subsystem 606, input subsystem 606, communication subsystem 610, and/or other subsystems not shown in FIG. 6.

Logic subsystem 602 includes one or more physical logic devices configured to execute computer instructions. For example, the logic subsystem may include hardware elements configured to execute instructions that are part of one or more software applications or other executable data constructs, and/or the logic subsystem may include one or more hardware or firmware elements configured to execute hardware or firmware instructions. Processors of the logic subsystem may have any suitable number of cores, and may execute instructions via sequential, parallel, and/or distributed processing. Individual components of the logic subsystem optionally may be distributed among two or more separate devices, which may in some cases be remotely located. In some cases, aspects of the logic subsystem may be virtualized and executed by remotely-accessible, networked computing devices—e.g., configured in a cloud-computing configuration.

Storage subsystem 604 includes one or more physical storage devices configured to temporarily and/or permanently hold computer information—e.g., instructions executable by the logic subsystem, and/or other suitable data. When the storage subsystem includes two or more devices, the devices may be collocated and/or remotely located. Storage subsystem 604 may include volatile, non-volatile, dynamic, static, read/write, read-only, random-access, sequential-access, location-addressable, file-addressable, and/or content-addressable devices. Storage subsystem 604 may include removable and/or built-in devices. In some cases, execution of instructions by the logic subsystem may change the data stored by the storage subsystem—e.g., to store new data.

In some cases, any or all aspects of logic subsystem 602 and/or storage subsystem 604 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperatively implement one or more logic machines. As used herein, the term "machine" is used generally to refer to the combination of computer hardware, firmware, software, instructions, and/or any other components that together provide computer functionality. In other words, "machines" are never abstract ideas and always have a tangible form. A machine may be instantiated by a single computing device, or a machine may be distributed between components of two or more different computing devices. A machine may include a local component (e.g., software application executed by a local computer processor) cooperating with a remote component (e.g., a network-accessible service provided by one or more remote computing devices).

When included, display subsystem 606 may be used to present a visual representation of any or all data held by storage subsystem 604. As one example, the visual representation may take the form of a user interface that presents information to and optionally receives input from a human user. Display subsystem 606 may include one or more display devices utilizing virtually any suitable type of display technology.

When included, input subsystem 608 may comprise or interface with one or more input devices. Input devices may include user input devices and/or sensor input devices. Non-limiting examples of user input devices may include a keyboard, mouse, or touch screen. Input devices of the input subsystem may include integrated devices and/or peripheral devices.

When included, communication subsystem 610 may be configured to communicatively couple any or all components of computing system 600 with one or more other computer components—e.g., corresponding to other computing devices. Communication subsystem 610 may include wired and/or wireless communication devices compatible with any suitable data communication protocols. The communication subsystem may be configured for communication via personal-, local- and/or wide-area networks.

The invention claimed is:

1. A method for privacy-preserving identity verification, comprising:

at a first computing node, maintaining a secured user account including a cryptographic salt and a plurality of verified identity details for a user;

at a second computing node, receiving the cryptographic salt, a unique user identifier for the user within an online community, and a community identifier for the online community;

at the second computing node, generating an identity profile identifier and an obfuscated community identifier, wherein the identity profile identifier is generated based at least in part on the unique user identifier, the community identifier, and a nonce identification value, and wherein the obfuscated community identifier is generated based at least in part on the community identifier and the cryptographic salt;

at a third computing node, generating a community membership record based at least in part on the obfuscated community identifier and the identity profile identifier;

at the first computing node, receiving the community membership record and one or more provisional identity claims submitted by the user;

at the first computing node, verifying the one or more provisional identity claims against the plurality of verified identity details as one or more verified identity claims, and generating a verification receipt corresponding to the one or more verified identity claims; and at the second computing node, generating an identity profile based at least in part on the verification receipt, the identity profile including the one or more verified identity claims, and the identity profile indexed by the identity profile identifier.

2. The method of claim 1, wherein the identity profile identifier is generated by concatenating and hashing the unique user identifier, the community identifier, and the nonce identification value.

3. The method of claim 1, further comprising, at the second computing node, deleting the unique user identifier, the community identifier, and the nonce identification value, while storing the identity profile identifier.

4. The method of claim 1, wherein the second computing node generates the identity profile identifier and the obfuscated community identifier as part of a session record having a unique session identifier, and the session record is received by the third computing node.

5. The method of claim 4, wherein the unique session identifier is included in the community membership record generated by the third computing node.

6. The method of claim 5, wherein the community membership record is a current community membership record, and the unique session identifier is a current unique session identifier, and the method further comprises, at the third computing node, receiving a prior community membership record associated with a prior unique session identifier, the prior community membership record previously received and stored by the first computing node, and wherein the prior unique session identifier is included in the current community membership record along with the current unique session identifier.

7. The method of claim 6, further comprising, prior to generating the verification receipt at the first computing node, confirming the prior unique session identifier included in the prior community membership record stored by the first computing node matches the prior session identifier included in the current community membership record.

8. The method of claim 1, wherein the cryptographic salt is encrypted using a public encryption key associated with the user.

9. The method of claim 1, wherein the second computing node generates a symmetric encryption key and encrypts the identity profile identifier as an encrypted identity profile identifier using the symmetric encryption key, and wherein the third computing node generates the community membership record based at least in part on the encrypted identity profile identifier.

10. The method of claim 1, wherein the plurality of verified identity details for the user are verified during a live review session via a Know Your Customer (KYC) service.

11. The method of claim 10, further comprising verifying during the live review session that the first computing node is not maintaining a preexisting user account for the user.

12. The method of claim 1, wherein the first computing node, the second computing node, and the third computing node are separate server computing devices.

13. The method of claim 1, wherein the verified identity details include one or both of a citizenship of the user and an age of the user.

\* \* \* \* \*